(12) United States Patent
Harris et al.

(10) Patent No.: US 11,815,682 B2
(45) Date of Patent: Nov. 14, 2023

(54) MULTI-AXIS MOVEMENT SUPPORT FOR OPTICAL COMBINER OF HEAD UP DISPLAY

(71) Applicant: BAE SYSTEMS plc, London (GB)

(72) Inventors: Samuel William Harris, Rochester (GB); Russell Christopher West, Rochester (GB)

(73) Assignee: BAE Systems PLC, London (GB)

( * ) Notice: Subject to any disclaimer, the term of this patent is extended or adjusted under 35 U.S.C. 154(b) by 290 days.

(21) Appl. No.: 16/755,618

(22) PCT Filed: Oct. 12, 2018

(86) PCT No.: PCT/GB2018/052925
§ 371 (c)(1),
(2) Date: Apr. 13, 2020

(87) PCT Pub. No.: WO2019/081884
PCT Pub. Date: May 2, 2019

(65) Prior Publication Data
US 2021/0199976 A1 Jul. 1, 2021

(30) Foreign Application Priority Data

Oct. 25, 2017 (EP) ..................................... 17275173
Oct. 25, 2017 (GB) ..................................... 1717547

(51) Int. Cl.
*G02B 27/01* (2006.01)
(52) U.S. Cl.
CPC ..... *G02B 27/0149* (2013.01); *G02B 27/0176* (2013.01)
(58) Field of Classification Search
CPC ............ G02B 27/0149; G02B 27/0176; G02B 2027/0154; G02B 2027/0159;
(Continued)

(56) References Cited

U.S. PATENT DOCUMENTS 5,182,675 A * 1/1993 Arbisi ..................... B60R 11/00
359/881
5,479,294 A 12/1995 Darrieux et al.
(Continued)

FOREIGN PATENT DOCUMENTS

EP 0674203 A1 9/1995
EP 1076255 A2 2/2001
(Continued)

OTHER PUBLICATIONS

International Search Report and Written Opinion received for PCT Application No. PCT/GB2018/052925. dated Dec. 21, 2018. 15 pages.

(Continued)

*Primary Examiner* — Bao-Luan Q Le
(74) *Attorney, Agent, or Firm* — Finch & Maloney PLLC

(57) ABSTRACT

A combiner assembly for a ceiling mounted projection head up display system for an aircraft cabin has an optical combiner (10), and a support mechanism (30, 32, 35) for supporting the optical combiner to be movable between an operational position and a stowage position, above the user, and laterally displaced, and facing an underside of the projector assembly by means of a lateral component of movement and a rotation component to reach the stowage position under the projector assembly (20). Such a two axis movement can make better use of limited headroom in cabins such as those of small aircraft, by enabling a stowage location offset to one side of the line of sight, while providing sufficient clearance from the user's head and from cabin structure, during the movement and/or when in the storage position.

19 Claims, 6 Drawing Sheets

(58) Field of Classification Search
CPC .... G02B 2027/0161; G02B 2027/0165; G02B 2027/0169
See application file for complete search history.

(56) References Cited

U.S. PATENT DOCUMENTS

| | | | | |
|---|---|---|---|---|
| 5,517,337 | A | * | 5/1996 | Dupin ................ G02B 27/0103 359/872 |
| 5,748,346 | A | * | 5/1998 | David ................ G02B 27/0149 359/881 |
| 5,748,395 | A | * | 5/1998 | Rendi, Jr. ................ B60R 1/081 359/865 |
| 5,841,408 | A | * | 11/1998 | Rickard ............. E05D 11/1007 359/362 |
| 5,966,255 | A | * | 10/1999 | Mochizuki ................ B60R 1/04 248/478 |
| 6,301,053 | B1 | * | 10/2001 | Cheesman ......... G02B 27/0149 359/632 |
| 6,445,506 | B1 | * | 9/2002 | Eccles ................ G02B 27/0149 359/632 |
| 8,749,890 | B1 | * | 6/2014 | Wood ....................... G02B 6/34 359/632 |
| 8,937,772 | B1 | | 1/2015 | Burns et al. |
| 9,696,552 | B1 | * | 7/2017 | Goergen .................. A42B 1/24 |
| 9,943,127 | B2 | * | 4/2018 | Lebel ........................ A45F 5/02 |
| 2007/0183055 | A1 | * | 8/2007 | Maliah ............... G02B 27/0149 359/632 |
| 2015/0130687 | A1 | * | 5/2015 | Kitamura .............. G01J 1/4204 345/7 |
| 2016/0062117 | A1 | * | 3/2016 | Imasaka .............. B60R 11/0235 359/602 |
| 2016/0216513 | A1 | * | 7/2016 | Uchiyama .......... G02B 27/0101 |

FOREIGN PATENT DOCUMENTS

| | | |
|---|---|---|
| EP | 2515157 A1 | 10/2012 |
| JP | H0526589 U * | 4/1993 |
| WO | 2010136572 A2 | 12/2010 |
| WO | 2019081884 A1 | 5/2019 |

OTHER PUBLICATIONS

GB Search Report under Section 17(5) received for GB Application No. 1717547.2 dated Apr. 13, 2018. 3 pages.
Extended European Search Report received for EP Application No. 17275173.7, dated Apr. 18, 2018. 9 pages.
International Preliminary Report on Patentability received for PCT Application No. PCT/GB2018/052925. dated May 7, 2020. 9 pages.
Examination Report Under Section 18(3) received for GB Application No. 1717547.2, dated May 27, 2020. 5 pages.
Search Report Under 17(6) received for GB Application No. 1717547.2, dated Mar. 22, 2021. 2 pages.

* cited by examiner

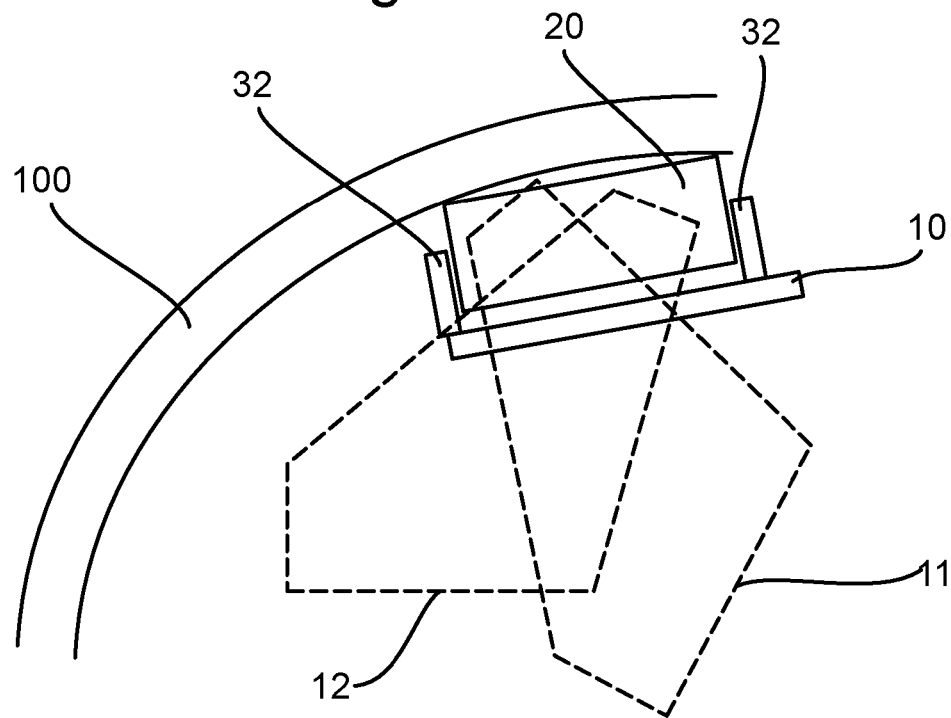
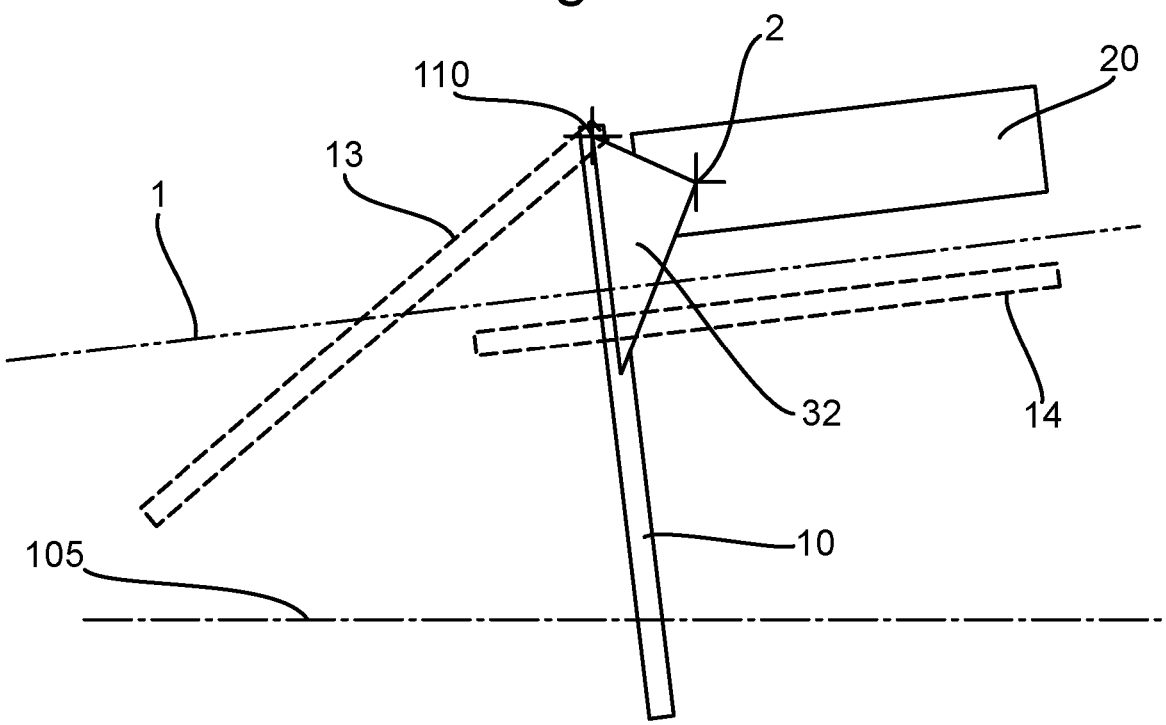

MULTI-AXIS MOVEMENT SUPPORT FOR OPTICAL COMBINER OF HEAD UP DISPLAY

This disclosure relates to supports for optical combiners of head up displays. Current head up displays such as overhead head up displays OHUD for aircraft cockpits for example have a projector mounted on a ceiling of the cabin above the user. An optical combiner is used to present a projected image to the user in the line of sight of the user, to combine the projected image with the real world view beyond the cockpit. The combiner may rely on pupil relay in which case the projector can be mounted above and behind the user. In this case there is space above the user for a stowage location for the optical combiner when not in use. A support for the optical combiner typically has a pivot to allow the optical combiner to be rotated from an operational position in the line of sight, towards the user and upwards into a stowage position.

For smaller cockpits it can be difficult to provide sufficient clearance from the user's head for this rotation, or sufficient clearance from the user's head when the optical combiner is in the stowage position, without fouling cabin structure or obscuring other instruments or displays. In some HUDs, a waveguide is used as an optical combiner, which can enable more compact designs than previously, as the waveguide is essentially planar. However, for such waveguide optical combiners the projector usually needs to be located closer to the input pupil of the combiner than before. This can be accommodated by locating the projector below the line of sight and offset to one side. It is still difficult for smaller cockpits to provide a support which provides sufficient clearance from the user for a waveguide type optical combiner in an OHUD, when the optical combiner is in the stowage position, or being moved into the stowage position from the operational position. It is known from U.S. Pat. No. 8,937,772B1 to provide a ceiling mounted HUD having a support for an optical combiner having a combiner arm mounted on a spherical bearing with guides to be rotatable in different directions from an operational position to a stowage position. One rotation moves the waveguide combiner sideways to the line of sight, and another rotation brings it up and away from the projector and to the stowage position aligned with an aircraft canopy.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. There is provided a combiner assembly for a projection head up display system, the system having ceiling mounted projector assembly, the combiner assembly having an optical combiner, and a support mechanism for supporting the optical combiner to be movable between an operational position and a stowage position, the operational position being in a line of sight of the user, facing a user, and the stowage position being above, and laterally displaced from the line of sight, and facing an underside of the ceiling mounted projector assembly. In this, the support mechanism provides a multi-axis movement between the operational position and the stowage position, the multi-axis movement comprising at least a rotational component about a first pivot having a substantially horizontal axis.

Other features may be added in particular embodiments, such as the multi-axis movement comprising a lateral component perpendicular to the line of sight. Another is the support mechanism being configured to make at least some of the lateral movement simultaneously with at least some of the rotation, when moving from the operational position to the stowage position. The mechanism can in some cases be arranged to complete the lateral movement before making the rotation about the first pivot, when moving from the operational position to the stowage position. The mechanism can have a second pivot for enabling rotation about a longitudinal axis, substantially parallel with the line of sight, to provide at least part of the lateral movement away from the line of sight. Another aspect provides a head up display comprising a projector assembly and the combiner assembly set out above, arranged such that the optical combiner, when in the operational position, is aligned with the projector to present an image from the projector in the user's line of sight. The head up display can be arranged so that the stowage position of the optical combiner is facing the underside of the projector assembly.

BRIEF DESCRIPTION OF THE DRAWINGS

Embodiments of the invention will be described, by way of example, with reference to the following drawings, in which:

FIG. 6 shows a schematic view of an embodiment showing a sideways tilted stowage position, FIG. 7 shows a schematic view of an embodiment showing side view and crash mechanism.

DETAILED DESCRIPTION

Figure 1:
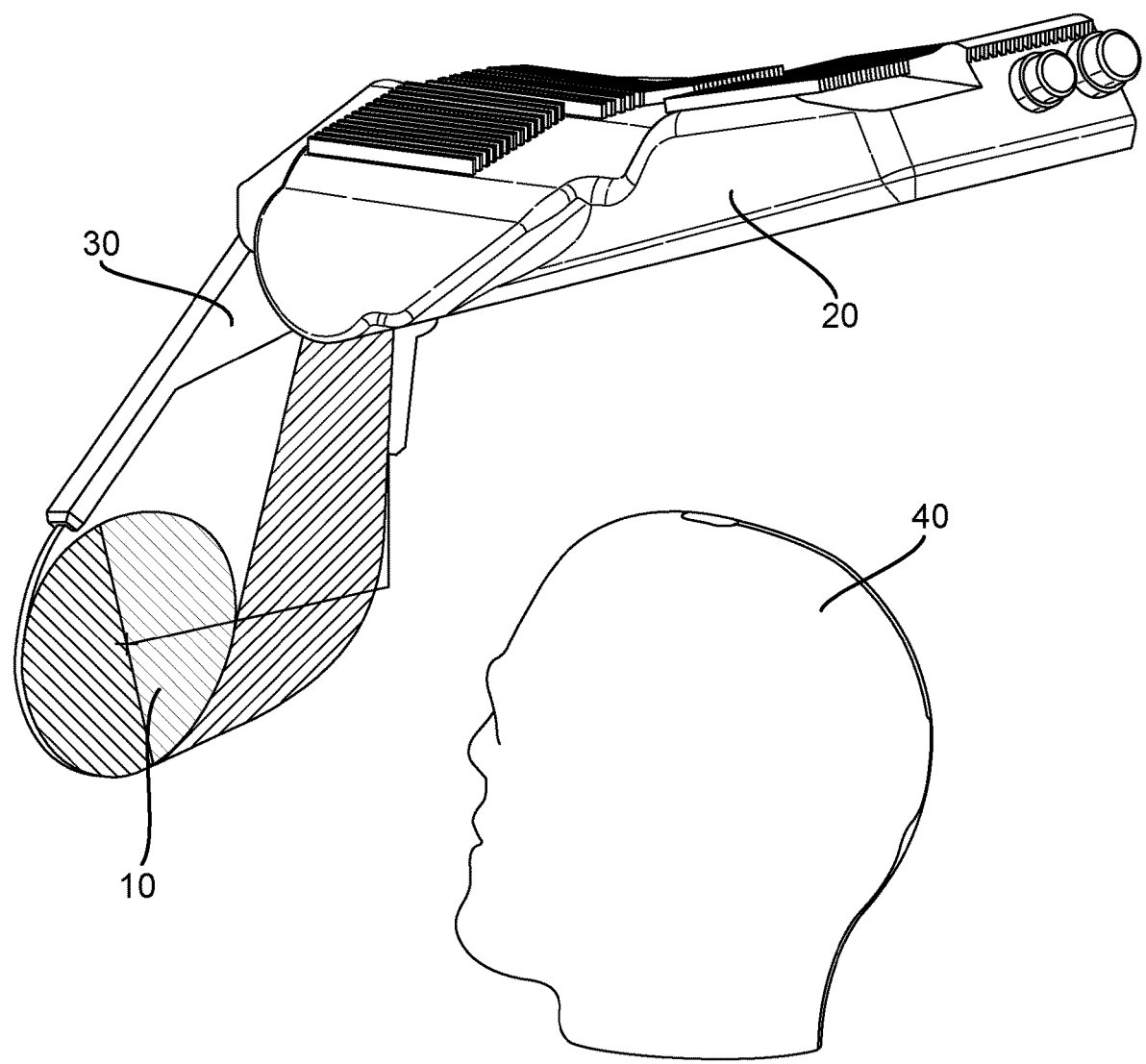
FIGS. 1-3 show three quarter views of an embodiment in operational position, mid-position and stowage position respectively.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

By way of introduction, some issues with current technologies will be set out. This disclosure is concerned with ways of mounting the optical combiner for use in displays such as OHUDs using a waveguide type combiner. An example of such a combiner is as shown in US2014/0218801. In some arrangements, the combiner is mounted in the glareshield or instrument panel with the projector below/side of the output, i.e. upside down to this disclosure. The presently described embodiments are for use in cabins such as small business jet cockpits where the projector is located above the pilot and offset laterally, where there is typically more space for the projector and its associated electronics. The presently described embodiments show a support which can enable the optical combiner to move through two axes from an operational position to a stowage position offset to one side of the pilot's head and facing the underside of the projector assembly. A typical waveguide type of combiner comprises an input in the form of a diffraction region for coupling an input pupil of image-bearing light into the waveguide for propagation by total internal reflection. The input pupil is expanded in one dimension along the waveguide when it reaches an output diffraction region. This expands the pupil in a second dimension and outputs the image-bearing light from the waveguide towards the user. Each of the diffraction regions are formed by separate gratings, having grooves inclined at an angle. So the image-bearing light incident on the input region is diffracted and propagated along the waveguide to the output grating which has its grooves arranged to output the light. Various alternative configurations are possible including having a non planar waveguide or having one or more reflecting surfaces, or expanding the projected beam in air, and so on, but at a cost of more complexity or less compactness. Hence the examples described below show a planar waveguide.

Figure 2:
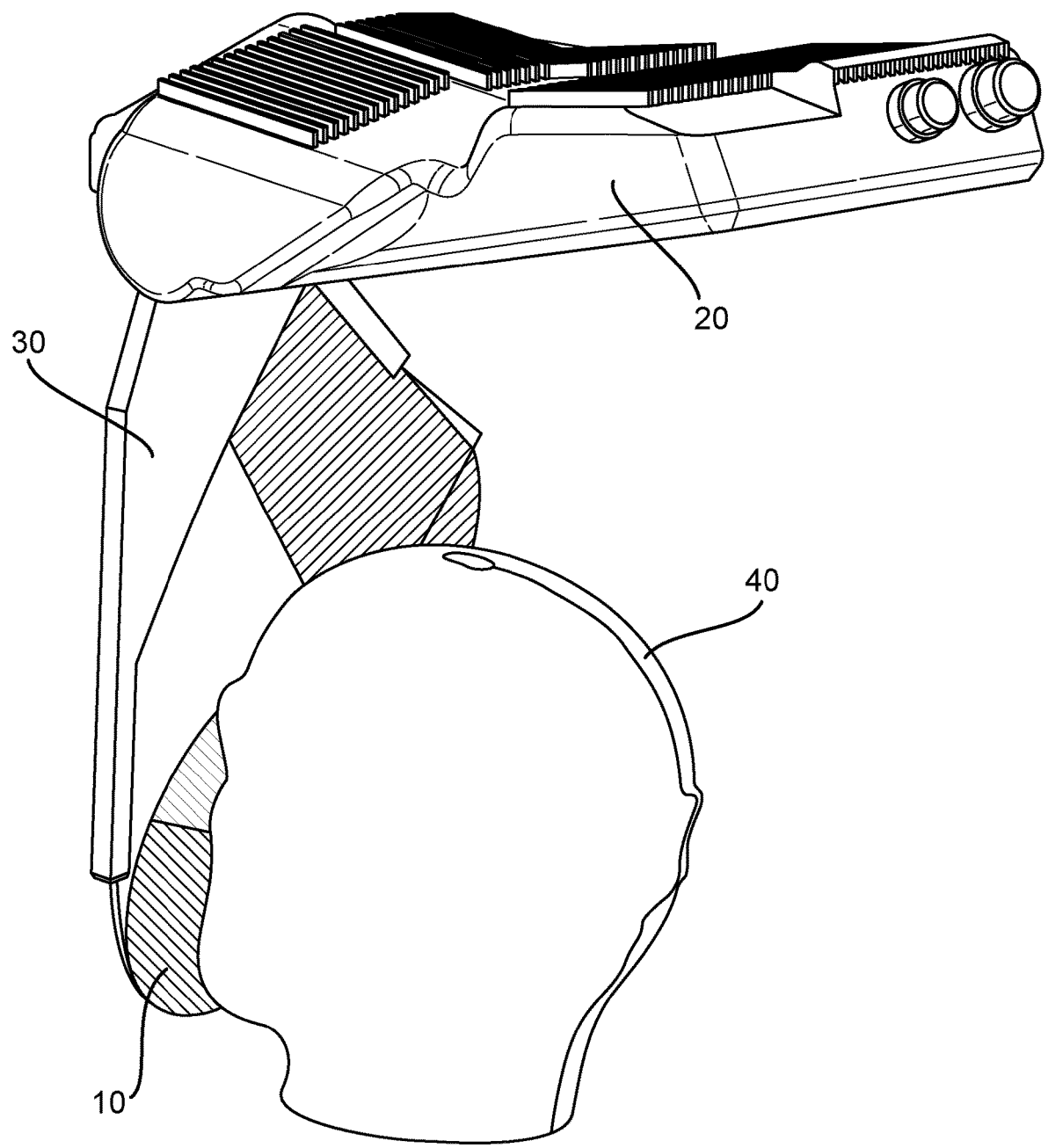
Figure 3:
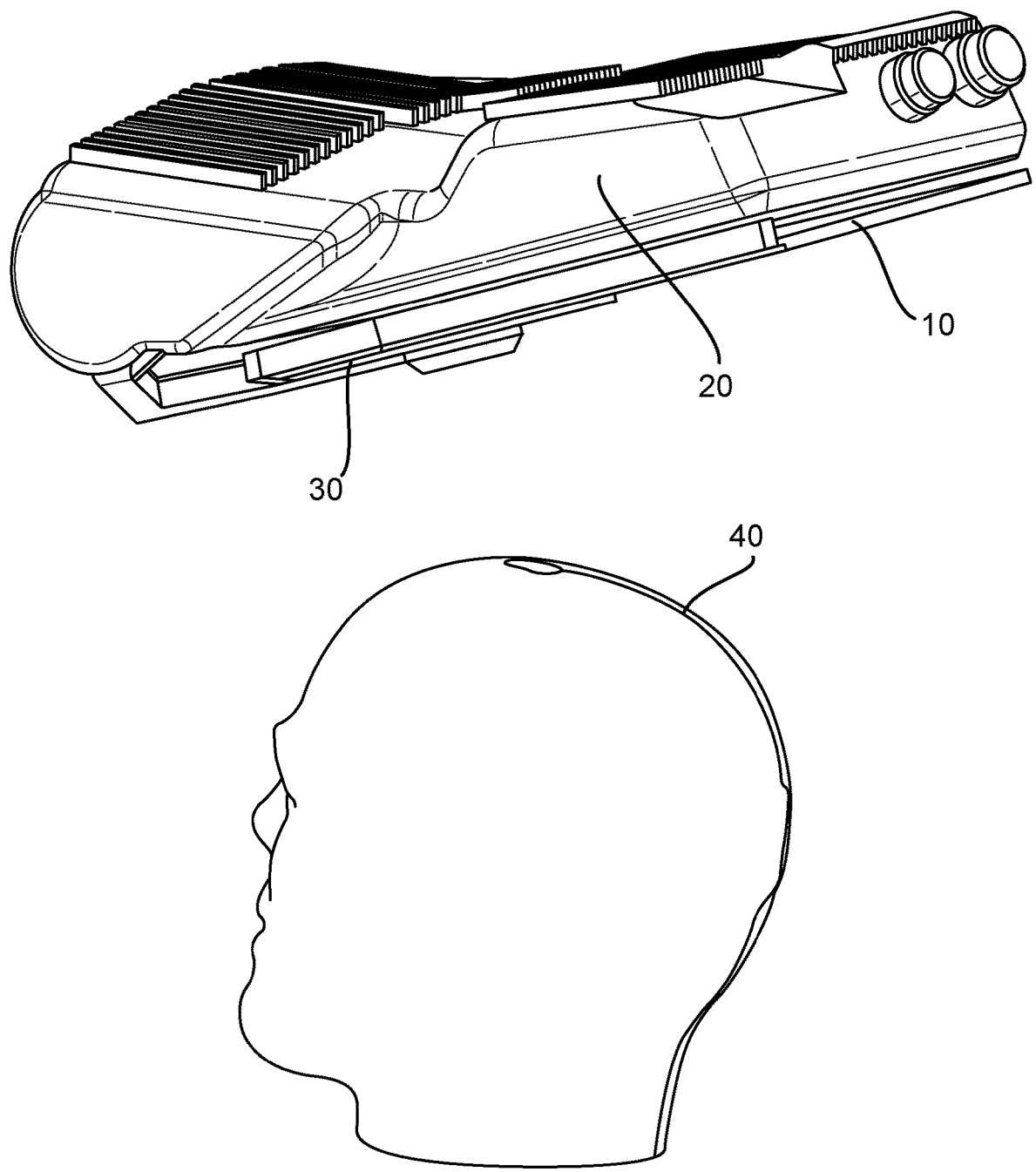

FIG. 1 shows a three-quarter view from above and rear, of an embodiment of a projection head up display system having a projector assembly 20, and a combiner assembly comprising the optical combiner 10 and a support 30 for supporting the optical combiner. Similar reference numerals have been used in FIGS. 2 and 3 as appropriate. The support is arranged to enable the optical combiner to be moveable between an operation position as shown in FIG. 1, facing a user 40, and a stowage position as shown in FIG. 3. The stowage position is shown as being parallel with a ceiling and up against the bottom of the projector assembly. The optical combiner is moveable through two axes, in two motions, carried out consecutively or overlapping, or in any combination of the two motions to reach the stowage position. FIG. 2 shows the optical combiner at a midpoint, after a first motion and before a second motion. The first motion is a lateral movement in the form of a rotation about a longitudinal axis, to move the optical combiner sideways from the view of the user, and downwards in this case, to a midpoint shown in FIG. 2. From that laterally offset position, the support provides for a second motion of rotation of about 90 degrees about a first pivot upwards towards the user and towards the bottom of the projector to reach the stowage position as shown in FIG. 3. This stowage position can provide some protection for the optical combiner, and can maintain clearance from the user's head (typically about 7.5 cm of clearance is needed) during the movements and in the stowage position.

Hence these figures show an example of a combiner assembly for a projection head up display system for use in a cabin, the combiner assembly having an optical combiner, and a support mechanism for supporting the optical combiner to be movable between an operational position and a stowage position. They show an example of the operational position being in a line of sight of the user, facing a user, and the stowage position being above, and laterally displaced from the line of sight and facing the underside of the projector assembly. They also show an example of the support mechanism providing a multi axis movement having at least a rotational component about a first pivot having a substantially horizontal axis. This can enable the optical combiner to reach the stowage position.

They also show an example of a head up display comprising a ceiling mounted projector assembly and the combiner assembly arranged such that the optical combiner, when in the operational position, is aligned with the projector to present an image from the projector in the user's line of sight. They also illustrate an example of a head up display in which the stowage position of the optical combiner is facing the underside of the projector assembly. This can enable the combiner assembly to fit into smaller cockpits while maintaining clearances, and provide a stowage position with a reduced footprint so that it does not obscure other displays or instruments.

By means of such a two (or more) axis movement, and particularly the rotational component about the substantially horizontal axis, the optical combiner can be rotated under the projector assembly to reach the stowage position. The lateral movement component is one way of enabling the stowage position to be laterally displaced, though other movement components could be used such rotation about a vertical axis. The movement and the stowage position can make better use of limited headroom in cabins such as those of small aircraft, by enabling a stowage location offset from the line of sight, while providing sufficient clearance from the user's head and from cabin structure, during the movement and/or when in the storage position. This can be useful since in some cabins, there is more headroom at locations offset from the line of sight, for example in a two-person aircraft cockpit, and in other cases, such as a single seat cockpit, there may be less height away from the line of sight, but more space above a shoulder of the user. For smaller cabins, this mechanism can help in avoiding aircraft structure, protecting the combiner underneath the chassis of the projector assembly, and/or improving ingress/egress access for the pilot. This mechanism also helps to enable the HUD to fit across as many different types of cabin as possible by being small enough to avoid the different aircraft structure styles on different aircraft.

In principle, these advantages are not dependent on how the lateral motion is achieved, nor whether the rotation about the first pivot is towards or away from the user. On this latter point, note that if rotated away, in principle a further motion could be used to slide or translate the combiner back towards the user, to reach the desired stowage position, though at the cost of a more complex mechanism.

Figure 4:
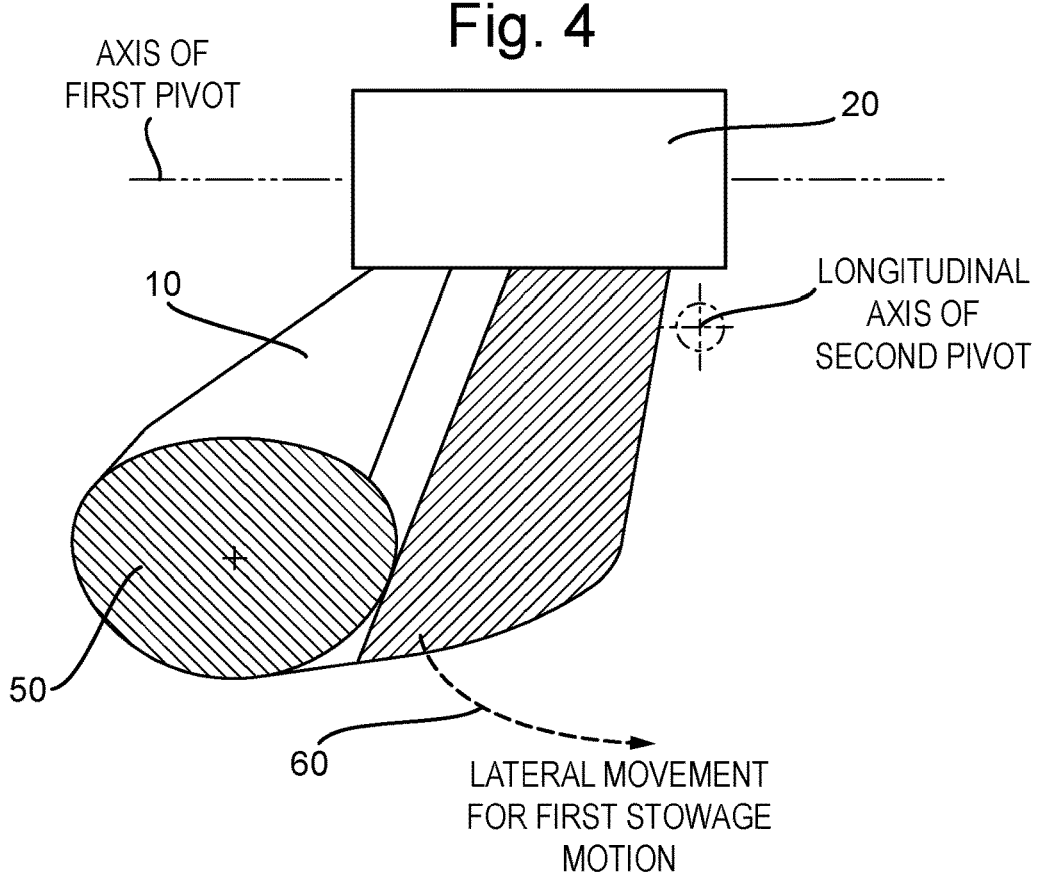
FIGS. 4 and 5 show schematic views of embodiments to show axes of rotation.
Figure 8:
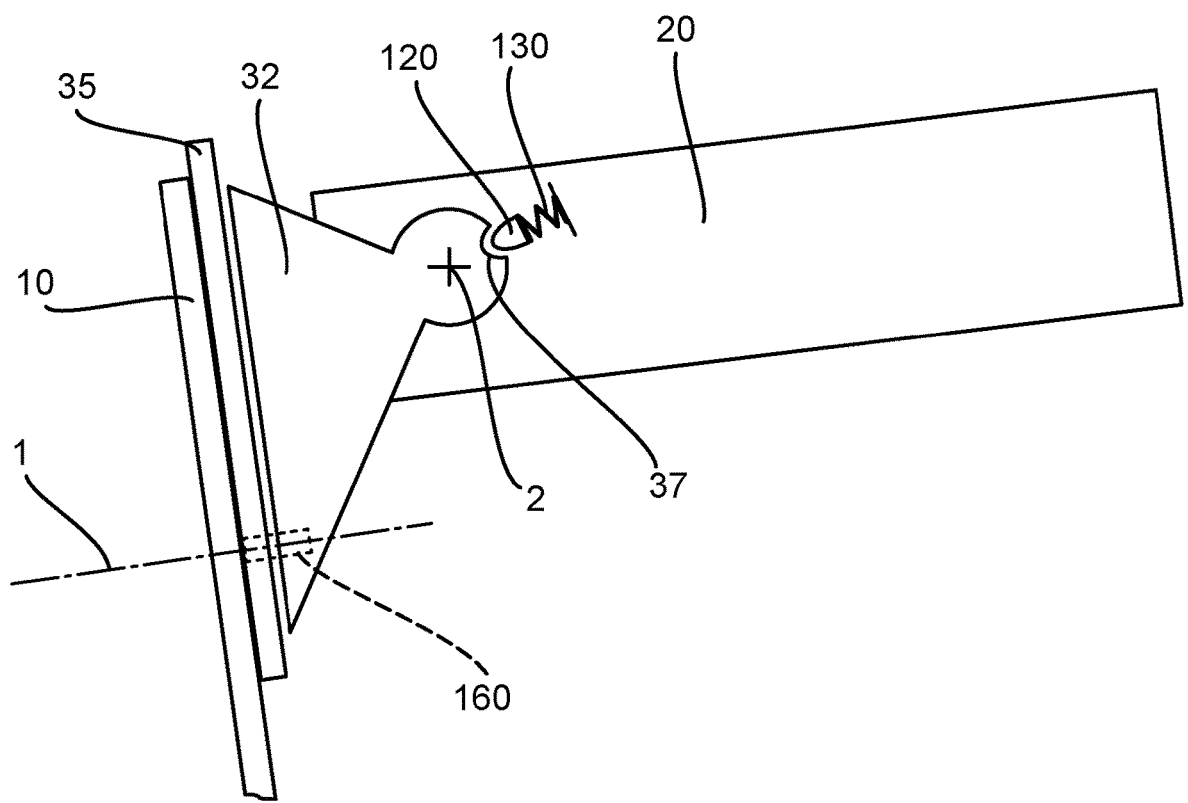
FIG. 8 shows a schematic side view of an embodiment first frame stop and second frame pivot.

FIG. 4 shows a schematic view of an embodiment similar to those of FIGS. 1 to 3, and similar reference numerals have been used as appropriate. It shows a view looking along a line of sight of the user, showing a projector 20, an optical combiner 10, and a dotted line circle on the combiner to show a waveguide output area 50. A longitudinal rotation axis 1 is shown normal to this view. Around this axis a dotted line arrow 60 shows a first stowage motion of the combiner. This is an example of the lateral component perpendicular to the line of sight, in the form of the rotation about the longitudinal rotation axis. Other alternatives are conceivable in principle such as a translation by a parallel linkage or sliding motion for example. The longitudinal axis 1 is shown below the projector, so for clarity, the figures don't show all of the mechanism to achieve the rotation. For example, not shown is a first frame hanging down from the projector to cover axis 1 and provide a pivot. A second frame is pivoted to the first frame at axis 1, and the optical combiner is mounted to this second frame. Examples of such frames are illustrated in FIGS. 6, 7 and 8, described below.

The support mechanism can therefore be two simple pivots, though alternatives are possible, such as a translation by sliding or parallel linkage for the lateral component of motion at least. References to pivots are intended to encompass virtual pivots. Also, there can be guide rails or slots provided to guide the motion, for example to ensure the lateral motion is predominant initially, or is completed before the upward rotation about the first pivot. This could be implemented with a latch or release pin or a gate, so that the first motion opens a path to allow the second.

Figure 5:
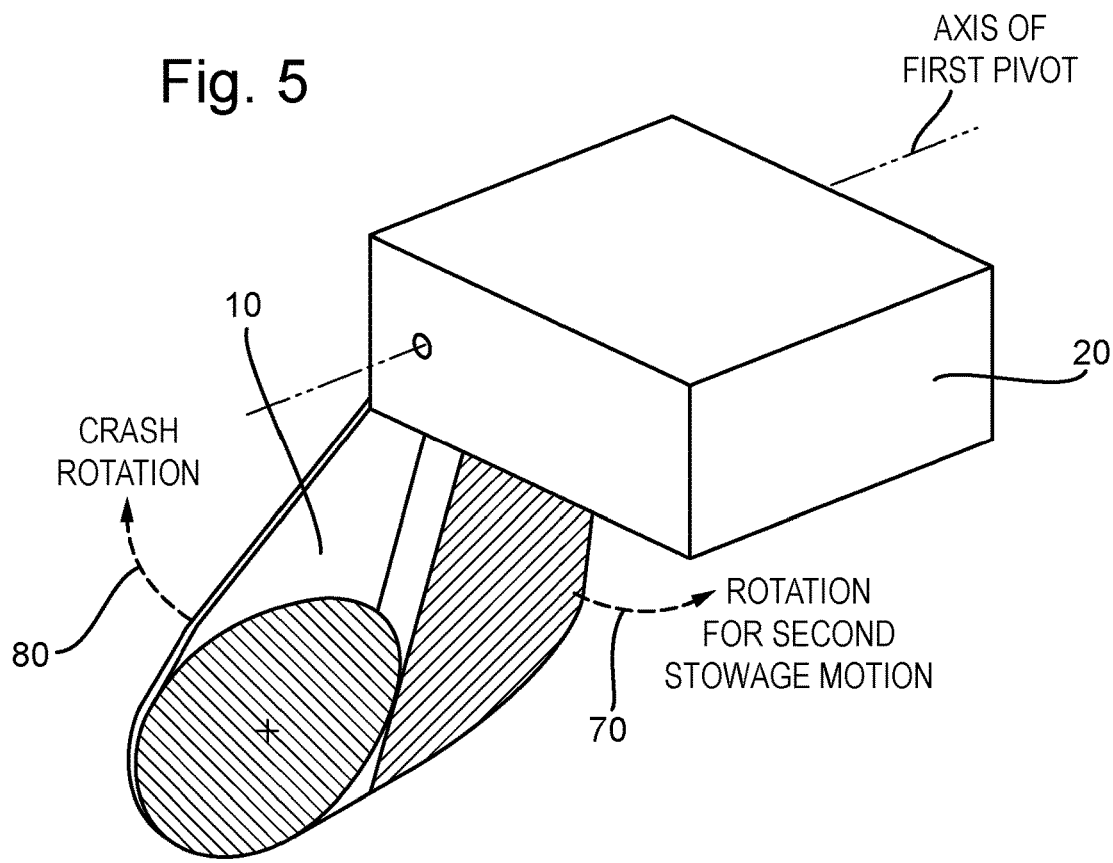

FIG. 5 shows a schematic view of the same embodiment and showing a first pivot for rotation about axis 2 for the second stowage motion, shown by dotted line arrow 70. This axis is shown as horizontal but it can be tilted from the horizontal to provide a tilted stowage orientation. Again, for the sake of clarity, in this view, not shown is a first frame hanging down from the projector to cover axis 1 and provide the anchorage for the second pivot for rotation around the longitudinal axis. This first frame would be pivoted on the projector to rotate relative to the projector around the first pivot. Other positions for this axis 2 are possible, but by having it offset away from the plane of the optical combiner, the optical combiner can be kept clear of the projector more readily during the rotation. This is particularly useful where the projector needs to be located close to the optical combiner. Also shown in FIG. 5 is a crash rotation denoted by dotted line arrow 80, which is a rotation about the same axis 2 (or another axis parallel to or near to this for example), of the optical combiner away from the user in the event of a crash. This can help avoid the risk of the pilot's head striking the optical combiner in the event of a collision.

Hence these figures show an example of a combiner assembly in which the support mechanism is configured to make at least some of the lateral movement simultaneously with at least some of the rotation about the first pivot, and ahead of some of the rotation, when moving from the operational position to the stowage position. By having the mechanism coordinate the two movements as stated, doing some of the lateral component ahead of the rotation about the first pivot, this can enable more clearance from the user's head during the movement, if this is a constraint. This coordination of the two movements can be done with a latch or release pin for example, or a gate, so that the first motion opens a path to allow the $2^{nd}$. These figures also show an example of the mechanism being arranged to complete the lateral movement before making the rotation about the first pivot, when moving from the operational position to the stowage position. This can help maximise clearance from the user's head during the movement.

These figures also show an example of the support mechanism having a second pivot for enabling rotation about a longitudinal axis, substantially parallel with the line of sight, to provide at least part of the lateral component of movement lateral to the line of sight. Such a second pivot is a relatively simple and convenient way of enabling such motion, and enables easy control of whether the stowage position is tilting to one side, according to the extent of rotation. It is intended to encompass pivots that are not exactly perpendicular, but is convenient if they are close to perpendicular, particularly if it is desired to have the storage position aligned with the projector chassis. It is possible to have the projector assembly arranged not perpendicular to the waveguide, but it can simplify the optics if they are perpendicular, and if the waveguide is perpendicular to the line of sight in the operational position. Also the field of view tends to be maximised for a given size of waveguide if it is perpendicular.

FIG. 6 shows a schematic view of another embodiment similar to that of FIGS. 4 and 5 and similar reference numerals have been used as appropriate. It shows a view looking along a line of sight of the user, showing a projector assembly 20, an optical combiner 10 in a stowage position, and showing a cross section of part of a roof 100 of the cabin. The cabin roof slopes down to the left, meaning there is more headroom to the right of the pilot. Hence the projector is offset to the right of the pilot's line of sight. This figure shows in a first dotted line outline 12 the operational position of the optical combiner. The output gratings would be at the bottom left and the input gratings at the top right of the optical combiner in this view. The midpoint position of the optical combiner after the first stowage motion by rotation to the right is shown by a second dotted line outline 11. In this position, the optical combiner hangs down almost vertically below the projector. On either side of the projector are shown the first frame 32, pivoted on the sides of the projector so as to be able to rotate around the first pivot. The first frame is coupled to the optical combiner 10 by a second frame (not shown for the sake of clarity), to enable the first stowage motion (shown by dotted line outlines 11 and 12) by rotation around the longitudinal axis (not shown) here. Notably in this example the axis of the first pivot, and the projector are tilted sideways to follow the slope of the ceiling of the cabin.

Hence this figure shows an example of a combiner assembly in which the rotation axis of the first pivot has a tilt away from horizontal so as to provide a tilt in the stowage position. This sideways tilt can be useful to enable the stowage position to align more closely to a sloping roof of the cabin or to the underside of the projector assembly for example, to make best use of limited space. This figure and the previous figures also show examples of the operational position of the optical combiner being arranged such that a projection input of the optical combiner is offset laterally from the line of sight. This means that the projector and electronics forming the projector assembly can be located laterally offset, where there is more headroom in some cases.

These figures also show an example of the stowage position being facing with the underside of the projector assembly such as a chassis of the projector assembly of the display. This means that the total surface area of cabin roof needed for optical combiner and projector can be reduced, and/or there may be less chance of obscuring other instruments or notices or displays on the cabin roof. Also, the rigid chassis of the projector may help provide some degree of protection from damage for the optical combiner when in the stowage position. There are various ways that such alignment to face the underside can be implemented, for example one side or end of the optical combiner could be just inside or lined up with a corresponding side or end of the projector to give protection from one side at least, even if other sides or ends overlap the edge of the projector chassis. In some cases the chassis can have a recessed underside to accept and protect part or all of the optical combiner if it sits sub-flush to the projector.

These figures also show an example of the optical combiner comprising an essentially planar waveguide having gratings to provide an expanded output pupil compared to a size of an input pupil. These supports are particularly suited to such optical combiners since they are particularly compact, and because for such combiners the projector typically needs to be located close to the combiner and so providing sufficient space for the stowage position is more of a problem.

FIG. 7 shows a schematic view of another embodiment similar to that of FIGS. 4, 5 and 6 and similar reference numerals have been used as appropriate. It shows a side view looking across a line of sight 105 of the user, shown by a single dot dashed line. It shows a projector assembly 20, an optical combiner 10 in the operational position and in dotted outlines the optical combiner in the stowage position 14 and in a crash position 13. The longitudinal axis 1 is shown by a double dot dashed line, and the axis 2 of the first pivot is shown normal to this view. A side of the first frame 32 is shown, coupling the optical combiner to the first pivot on the projector shown by axis 2. An axis 110 for a third pivot is shown at the top of the optical combiner, allowing rotation of the optical combiner away from the user towards the crash position. As can be seen in the example of FIG. 1 the projector chassis design is lower at the front of the projector and has more head clearance at the back. This means that there can still be some clearance above the projector at the front of the chassis for the waveguide and there is potential room outboard of the chassis for parts of the crash mechanism, depending on the cockpit structural layout. This can help enable better clearance from the projector at the input to the waveguide. Also, this would benefit the breakaway motion as there would be more momentum from the mass of the combiner due to the larger moment from the pivot.

The movement to the crash position is sometimes called a Head Impact Criterion "HIC" phase and can involve powered movement of the combiner, and/or movement as a result of inertia during a collision, to cause the combiner to rotate away from the pilot. In a collision inertia pushes the waveguide forwards out of the operational position around the axis 2 of the first pivot (or a nearby axis). It is then propelled forwards from that position so that it moves faster than the pilot's head and hence the pilot doesn't hit it. The power can be provided by a spring arrangement or other power source to move the waveguide, which then stays in the forward position, either latched or by the springs. So, there can be two phases to the HIC motion—dislodging from the operational position, and then the active propelled movement forwards.

In some cases, the same axis 2 can be used as the pivot for both deployment and for the HIC movement, but in some cases, depending on the location of the axis 2, this could cause difficulty with clearances for the path of the top of the optical combiner, which might foul the cabin roof or the top of the projector. Or the propelling mechanism for the HIC phase might not be clear of the optical combiner during the stowage movement for example. If so, then an alternative is to have a third axis which provides the HIC movement as shown by axis 110 in FIG. 7, at the cost of a more complex mechanism.

This figure therefore shows an example of the mechanism being arranged such that the first pivot is nearer a top than a bottom of the optical combiner when in the operational position, and such that the axis of the first pivot is offset from a plane of the optical combiner towards the user. This can help keep the optical combiner clear of the projector during the rotation for the second stowage motion, with a relatively convenient and simple construction.

The figure also shows an example of the combiner assembly mechanism comprising a crash mechanism for enabling movement of the optical combiner from the operational position away from a trajectory of the user in the event of a crash. This can help maintain crashworthiness. Hence also the figure shows an example of the crash mechanism having a third pivot, having a rotation axis parallel with that of the first pivot, arranged to enable the optical combiner to rotate away from the user. An advantage of such a third pivot with a parallel axis is simplicity and convenience of construction.

FIG. 8 shows a schematic view of another embodiment similar to that of FIGS. 4, 5, 6 and 7 and similar reference numerals have been used as appropriate. It shows a side view with the projector 20, and one side of the first frame 32 of the support mechanism 30, pivoted on the projector about the first pivot indicated by axis 2. Also shown is the longitudinal axis 1 by a double dot dashed line, and a second frame 35 of the support mechanism 30, fixed to the optical combiner 10. A second pivot 160 is shown for coupling the second frame 35 to the first frame 32 so that the second frame and thus the optical combiner can pivot around the longitudinal axis to carry out the lateral component as a first stowage motion by such rotation away from the operational position. Also shown is a stop for maintaining the first frame in the operational position. To achieve this is shown in schematic form a recess 37 in a curved edge of the first frame 32, where it is curved with a radius centred on the axis 2 of the first pivot. Into this recess is fitted a radially movable roller or peg 120, biased into the recess by a spring 130 anchored at one end to the projector. This is a way to provide a bias to maintain the desired operational position of the first frame, against vibration and g-forces during flight, yet allow manual or powered rotation towards the stowage position when desired. Various mechanical equivalents can be envisaged, such as making the recess movable instead of the roller or peg, or having the roller or peg mounted on the first frame, to fit a recess in the projector. In some cases, rotation in both directions needs to be allowed if the same axis is to be used for the crash motion. Otherwise the stop mechanism can be arranged to provide an immovable stop in one direction and a releasable stop in the other direction of rotation. Many variations or ways of implementing such mechanism can be envisaged, and the illustration is only an example illustrated schematically.

Accordingly, this figure shows an example of a combiner assembly in which the mechanism for providing the rotation about the first pivot has a stop and a biasing mechanism for maintaining the optical combiner against the stop in the operational position. This means that the optical combiner can maintain its position with more resistance to vibration or g-forces during flight for example.

As has been described, a combiner assembly for a ceiling mounted projection head up display system for an aircraft cabin has an optical combiner, and a support mechanism for supporting the optical combiner to be movable between an operational position and a stowage position, above, and laterally displaced from the line of sight, and facing an underside of the projector assembly, by means of a lateral movement and a rotation about a first pivot. Thus, the stowage position can be perpendicular to an orientation of the operational position and under the projector assembly. The ordering of first and second stowage movements can help to ensure clearance so that the combiner doesn't strike the pilot, but if clearance is not an issue, then the reverse order could conceivably be used. In other words the upward rotation about the first pivot is followed by a lateral movement away from the line of sight, to reach the stowage position laterally offset from a centre line of the user. The axis of the first pivot is shown as horizontal or substantially horizontal and lateral in the sense of perpendicular to the line of sight, but alternatives are conceivable, for example the lateral movement could comprise a first rotation about a vertical axis to clear the line of sight, followed by a second rotation to about a substantially longitudinal axis to reach the substantially parallel orientation of the stowage position.

One or both rotation axes could have their movement damped. If the axis 2 of the first pivot is shared with the HIC movement, then damping may be more important to absorb energy of any spring in the HIC mechanism during storage. The extent of rotation in the HIC phase can be set according to pre-determined HIC criterion for the aircraft and according to the designed distance from eye to combiner in the operational position.

Notably the axes need not be at 90 degrees to each other. Axis positions, both relative to the cockpit and each other, can be varied to give the required deployed and stored positions. In some designs axes perpendicular to each other and aligned to the aircraft axes can be used, but others may be useful depending on designs. The stowage position typically needs to be such that cockpit surface surrounding projection part is not obscured by waveguide in stored position as it may have switches and displays on. The combiner typically does not need to lie at 90 degrees to the pilot's line of sight in the operational position, depending on the optical design of the gratings on the waveguide, but it is usually simpler if it is essentially perpendicular.

There can be some provision for latching the optical combiner in the stowage position. There can be damping provided to avoid the combiner colliding with a stop at high momentum. There can be suitable damping applied to the HIC movement. The stowage position can be designed with less accuracy as exact position and vibration resistance is less important than for the operational position. There is a particularly useful application to small business jets which typically have constrained headroom, and may be unable to fit a larger HUD, and so conventionally have been unable to gain the benefits of a HUD, until the combiner stowage clearance problem is resolved, as is now shown in this disclosure.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A combiner assembly for a projection head up display system, the system having ceiling mounted projector assembly, the combiner assembly having:
   an optical combiner; and
   a support mechanism for supporting the optical combiner, the support mechanism movable between an operational position and a stowage position, the support mechanism having a first frame and a second frame, the first frame configured to be coupled to the projector assembly, the second frame coupled to the first frame and to the optical combiner,
   wherein the operational position is in a line of sight of the user, facing a user,
   wherein the stowage position is above, and laterally displaced from, the line of sight, and facing an underside of the ceiling mounted projector assembly,
   wherein the first frame is configured to rotate about a first pivot with respect to the projector assembly such that the support mechanism is movable between the operational position and the stowage position, and
   wherein the second frame is coupled to the first frame at a second pivot and configured to rotate about the second pivot with respect to the first frame and substantially parallel to the line of sight such that the support mechanism is rotatable to provide at least part of a lateral movement of the optical combiner away from the line of sight, the second pivot for enabling rotation about only a longitudinal axis, substantially parallel with the line of sight, to provide at least part of the lateral movement of the optical combiner away from the line of sight.

2. The combiner assembly of claim 1, the lateral movement being perpendicular to the line of sight.

3. The combiner assembly of claim 2, the support mechanism being configured to make at least some of the lateral movement simultaneously with at least some of the rotation, and ahead of some of the rotation, when moving from the operational position to the stowage position.

4. The combiner assembly of claim 2, the support mechanism being arranged to complete the lateral movement before making the rotation about the first pivot, when moving from the operational position to the stowage position.

5. The combiner assembly of claim 1, the first pivot having a rotation axis tilted away from horizontal so as to provide a tilt in the stowage position.

6. The combiner assembly of claim 1, the operational position of the optical combiner being arranged such that a projection input of the optical combiner is offset laterally from the line of sight.

7. The combiner assembly of claim 1, the optical combiner comprising a waveguide having gratings to provide an expanded output pupil compared to a size of an input pupil.

8. The combiner assembly of claim 1, the support mechanism being arranged such that the first pivot is nearer a top than a bottom of the optical combiner when in the operational position, and such that the rotation axis of the first pivot is offset from a plane of the optical combiner towards the user.

9. The combiner assembly of claim 1, the mechanism comprising a crash mechanism for enabling movement of the optical combiner from the operational position away from a trajectory of the user in the event of a crash.

10. The combiner assembly of claim 9, the crash mechanism having a third pivot, having a substantially horizontal rotation axis, arranged to enable the optical combiner to rotate away from the user.

11. The combiner assembly of claim 1, the support mechanism having a stop and a biasing mechanism for maintaining the optical combiner against the stop in the operational position.

12. A head up display comprising a projector assembly and the combiner assembly of claim 1, arranged such that the optical combiner, when in the operational position, is aligned with the projector to present an image from the projector in the user's line of sight.

13. A combiner assembly for a projection head up display system, the system having ceiling mounted projector assembly, the combiner assembly having:
   an optical combiner; and
   a support mechanism for supporting the optical combiner, the support mechanism moveable along a path between an operational position and a stowage position, the support mechanism having a first frame and a second frame, the first frame configured to be coupled to the projector assembly, the second frame coupled to the first frame and to the optical combiner, the support mechanism comprising a first pivot having a first axis and a second pivot having a second axis, wherein the first frame is configured to rotate about the first pivot with respect to the projector assembly, and wherein the second frame is coupled to the first frame at the second pivot and configured to rotate about the second pivot with respect to the first frame and substantially parallel to a line of sight of a user, the second pivot for enabling rotation about only a longitudinal axis, substantially parallel with the line of sight, to provide at least part of the lateral movement of the optical combiner away from the line of sight.

14. The combiner assembly of claim 13, wherein the first axis of the first pivot is substantially perpendicular to the line of sight, and the second axis of the second pivot is substantially perpendicular to the first axis.

15. The combiner assembly of claim 13, wherein the support mechanism includes a roller or peg located along the path, such that the initial lateral movement to the roller or peg along the path opens the path to allow simultaneous movement of the support mechanism about both the first and second axes.

16. The combiner assembly of claim 13, wherein: the first axis is horizontal or tilted away from horizontal so as to be substantially horizontal; and the operational position of the optical combiner is arranged such that a projection input of the optical combiner is offset laterally from a user line of sight.

17. A head up display comprising a projector assembly and the combiner assembly of claim 13, arranged such that the optical combiner, when in the operational position, is aligned with the projector to present an image from the projector in a user line of sight.

18. A combiner assembly for a projection head up display system, the system having ceiling mounted projector assembly, the combiner assembly having:
   an optical combiner comprising a waveguide having gratings to provide an expanded output pupil compared to a size of an input pupil; and
   a support mechanism for supporting the optical combiner, the support mechanism moveable along a path between an operational position and a stowage position, the support mechanism having a first frame and a second frame, the first frame configured to be coupled to the projector assembly, the second frame coupled to the first frame and to the optical combiner, the support mechanism comprising a first pivot having a first axis and a second pivot having a second axis, wherein the first frame is configured to rotate about the first pivot with respect to the projector assembly, and wherein the second frame is coupled to the first frame at the second pivot and configured to rotate about the second pivot with respect to the first frame and substantially parallel to a line of sight of a user, the second pivot for enabling rotation about only a longitudinal axis, substantially parallel with the line of sight, to provide at least part of the lateral movement of the optical combiner away from the line of sight.

19. A head up display comprising a projector assembly and the combiner assembly of claim 18, arranged such that the optical combiner, when in the operational position, is aligned with the projector to present an image from the projector in the line of sight.

* * * * *